May 16, 1961 F. M. TRAPNELL, JR., ET AL 2,984,827
PHASE ALTERNATING STATUS KEEPER
Filed Dec. 11, 1959 2 Sheets-Sheet 1

*INVENTORS*
FREDERICK M. TRAPNELL JR.
HUGH C. HILLIARD JR.
*BY* [signature]
*ATTORNEY*

May 16, 1961 F. M. TRAPNELL, JR., ET AL 2,984,827

PHASE ALTERNATING STATUS KEEPER

Filed Dec. 11, 1959 2 Sheets-Sheet 2

2,984,827
Patented May 16, 1961

2,984,827

PHASE ALTERNATING STATUS KEEPER

Frederick M. Trapnell, Jr., Poughkeepsie, N.Y., and Hugh C. Hilliard, Jr., Cambridge, Mass., assignors to International Business Machines Corporation, New York, N.Y., a corporation of New York Filed Dec. 11, 1959, Ser. No. 858,964

6 Claims. (Cl. 340—174.1)

This invention relates to a system for keeping the status of information sequentially recorded on or read from a magnetic drum.

In many instances, it is desirable to record information on, or read information from, a magnetic drum in monotonic increasing order of angular address, but at a rate asynchronous to drum speed. Ordinarily, magnetic drums in data assembling and processing systems have a plurality of data bands into which independent information may be recorded. In such systems it is uneconomical to provide external circuitry to remember where the next word is to be recorded or read in each of such bands. The invention herein, therefore, provides a system which uses a single status band associated with each data band of the drum to provide means for locating the next data slot of the drum in which a data reading or writing operation may take place.

Magnetic drum storage systems have been heretofore proposed for automatically recording or reading drum data asynchronously without resort to conventional data address devices. These prior proposals have, however, involved the use of a plurality of status bands associated with each data band of the drum, and usually also a plurality of read-write heads with each status band and/or external delay circuits to compensate for drum rotation.

It is, therefore, the primary object of this invention to provide a status keeping system which is very simple in that it uses a single status band and a single read-write head for such status band to control addressing for one field of drum data.

It is a further object of this invention to provide a data status keeping system which will operate at high bit density, since data advancing herein does not depend on having the written status mark rewritten back into the correct angular position of the drum.

It is still a further object of this invention to provide a system which utilizes a stored bit to provide the information as to which of two possible data slots on the drum is the correct one in which to perform a reading or writing operation.

It is another object of this invention to provide a system in which alternate reading and writing of a status bit in a single status track results in automatic status advancing, and in which no special delay devices or revolvers are required, and which is not critical as to timing.

It is still another object of this invention to provide a system in which status marks in the status band of the drum are written over pre-existing status marks, whereby the logic of the system is simplified.

It is yet a still further object of this invention to provide a status keeping system which will locate the next drum position in a prescribed sequence where read-write action is to take place.

The novel features of the invention that are considered characteristic are set forth with particularity in the appended claims, the details of the invention itself both as to its organization and method of operation, as well as additional objects and advantages thereof will best be understood from the following description when read in connection with the accompanying drawings, in which like reference numerals indicate like elements, and in which:

Figure 1:
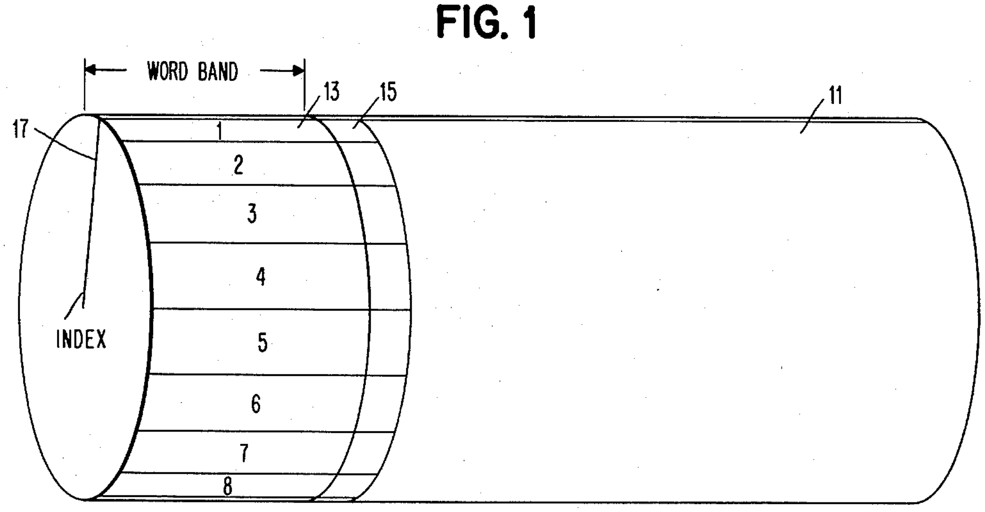
Fig. 1 is a diagrammatic illustration of a magnetic drum indicating thereon successive recording locations constituting a word band and an associated status band.

In Fig. 1 a drum 11 is designed to have thereon a plurality of word bands each consisting of sequential data slots or valid record locations. One such word band 13 is shown at the left end of the drum. Others may be provided as may be required within the capacity of the drum. The word band 13 has associated with it a single status band 15 into which a status bit may be recorded opposite the word locations of the word band. The data locations of the word band are sometimes referred to as "data or word slots." As shown in Fig. 1, the sequential data locations are numbered 1 through 8 beginning at an index point 17 which can be electrically sensed during the revolution of the drum to initiate read-write operations in respect to the drum.

Figure 2:
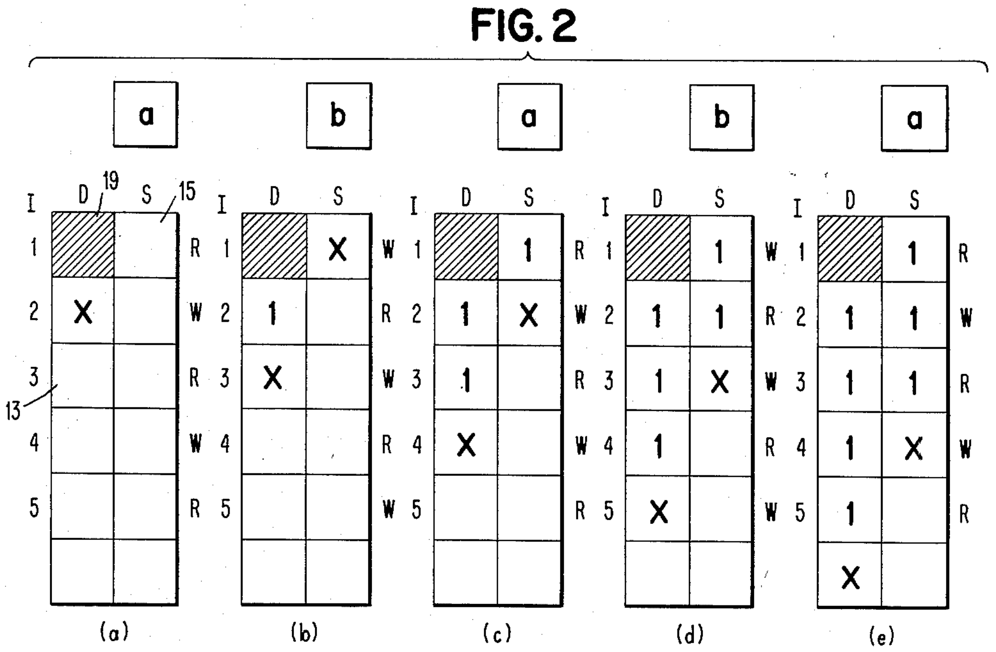
Fig. 2 is an explanatory diagram showing five steps of the status keeping operation.

Fig. 2 is composed of a sequence of schematic diagrams of the data band 13 and the status band 15 during different data recording cycles. Each of the diagrams is taken in sequence beginning at the drum index 17, and it may be observed by reference to Fig. 2 that the first data slot 19 is not used.

The status track 15 is used to find the correct location for the next read-write operation as follows. The status keeping system alternately reads and writes in each successive status bit position. In Fig. 2 this fact is indicated by an R or a W opposite each status bit position. Whether the system reads or writes in the odd positions as determined by a status phase bit which is represented in the blocks above the diagrams of the status track of Fig. 2. The status bit is complemented after each recording cycle so that reading or writing takes place in alternately even (odd) and odd (even) locations.

Basically, the system operates by starting in position one following the drum index, either reading or writing a one in the status track 15 according to the status phase bit, and it will then continue to read and write ones in alternate bit positions of the status band until a zero is first detected on a reading cycle. When a zero is detected, the status phase bit is complemented, data is either read or recorded in the following data position of the band 13, and the status keeping operation is discontinued. Thus, Fig. 2 discloses, by way of example, that if the status phase bit is *a*, the system will first read and then write, whereas when the status bit is changed to *b*, as shown in Fig. 2(*b*), the system will first write and then read.

Fig. 2(*a*) shows the status and data bands empty as they would be at the start of a recording period. Since the phase bit is *a*, the status keeper reads in the odd positions and writes ones in the even positions. However, in the condition represented in Fig. 2(*a*), a zero is detected immediately in position $S_1$. Therefore, data is recorded in position $D_2$. The next time information is to be recorded, the condition of Fig. 2(*b*) prevails. According to this figure, the phase bit is shown to be *b*, so that the status keeper starts by writing a one in $S_1$ and subsequently reading a zero in $S_2$. Therefore, data is written in $D_3$. When data is written again, as in Fig. 2(*c*), the phase bit is again *a* such that the status mark will be written in position $S_2$ and data will be written in position $D_4$. It may be noted that in general, as illustrated in Figs. 2(d) and 2(e), status marks will be written over old status marks.

When the data band 13 has been filled and the information in the data band has been transferred elsewhere or is otherwise no longer useful then the previous status marks and data records are erased and the status keeping system is ready for reuse. It remains to be seen how the circuitry illustrated in Fig. 3 performs to maintain status as above described.

Figure 3:
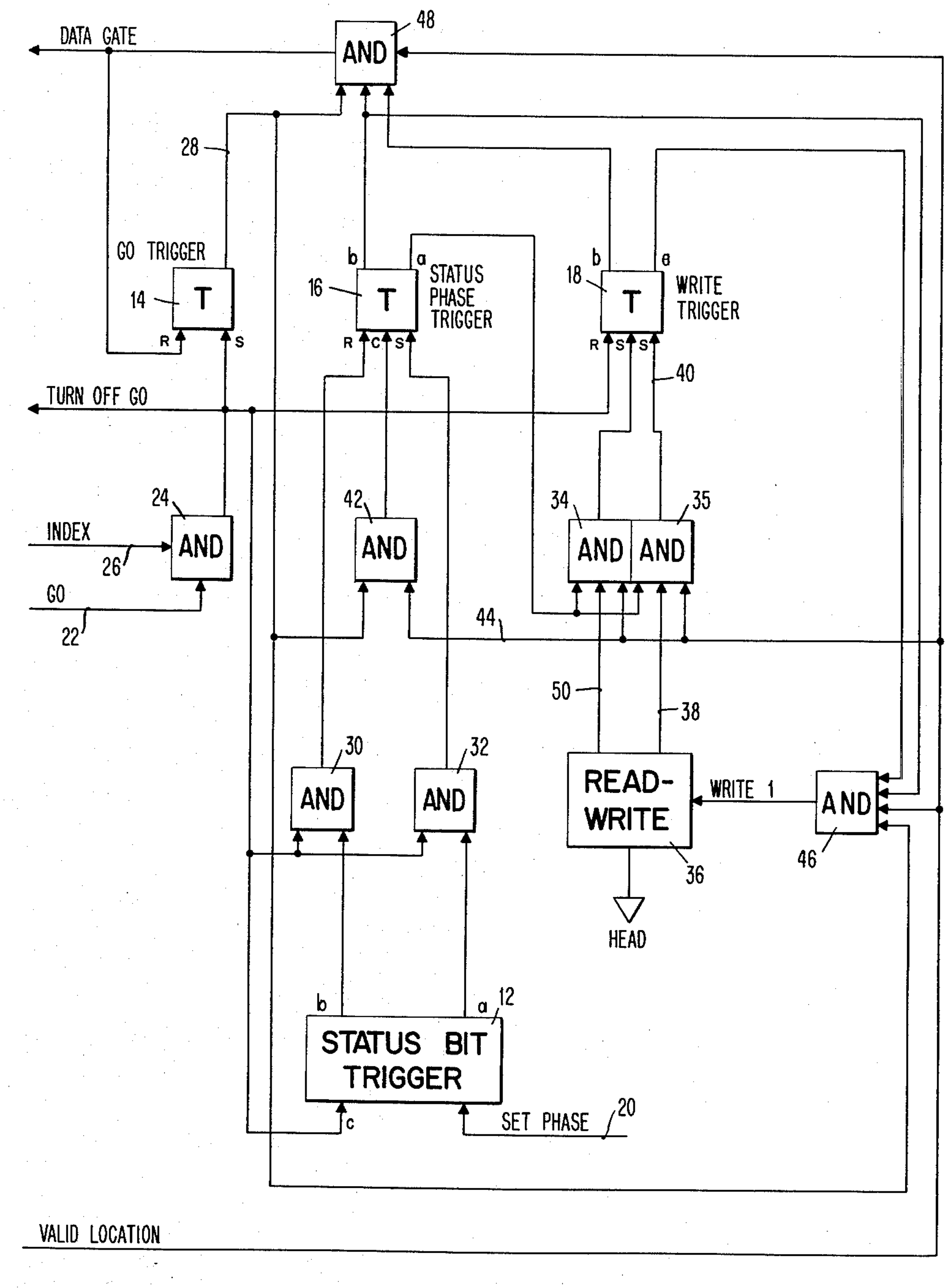
Fig. 3 is a diagram in block form of a circuit designed to perform the status keeping operation.

The status keeper circuit of Fig. 3 is generally under control of a Status Bit trigger 12, a Go trigger 14, a Status Phase trigger 16 and a Write trigger 18. These triggers are interconnected by a plurality of coincidence circuits, herein referred to as AND circuits, to control a read-write circuit associated with the status band of the drum, or, alternately, to produce an output signal by which a data reading or writing operation may be performed on the drum.

The Status Bit trigger 12 is conditioned to agree with the status bit representation in Fig. 2 at the beginning of each data read-write cycle to alternately read ones and write ones in the status bit band of the drum, or to alternately write ones or read ones in the status bit track depending on the state to which the trigger is set at the outset. The Go trigger 14 conditions the system for operation and interrogates the outputs of the Status Bit trigger 12 to determine which of its outputs is high. The Status Phase trigger 16 determines whether a phase bit will be read from the drum or written upon the drum, and the Write trigger 18 determines, in response to information read in the status band, whether a one is to be writen on the drum or whether a Data Gate is to be generated by which the reading or writing of drum data may be controlled.

When the system is placed into operation, the state of the Status Bit trigger 12 is first set with its *a* output high to condition the system for first reading from the status bit track, for example. Assuming, therefore, that the *a* output of the Status Bit trigger is high with the original setting on the Set Phase line 20, and the Go signal, which represents the presence of information to be recorded or the demand for information from the drum, is present on the Go line 22 which conditions one input to an AND circuit 24. Now, upon a pulse generated by the drum index on line 26 which is the second input to the AND circuit 24, the Go trigger 14 will be set, such that its output line 28 will have an output potential thereon. The pulse passing through the AND circuit 24 also samples a pair of AND circuits 30 and 32 to permit transfer of the Status Bit trigger setting to the Status Phase trigger 16. Specifically, the AND circuit 32 will pass the potential from the *a* autput of the Status Bit trigger 12 to the Status Phase trigger 16 when the pulse from the AND circuit 24 is present. The output of the AND circuit 32 is the set input to the Status Phase trigger 16 and so conditions this trigger that its *a* output is high.

The pulse at index time, which is the output of the AND circuit 24, is also a set input to the Write trigger 18 which effectively conditions the Write trigger 18 with a potential on its *a* output. With the circuit so conditioned, the signal Valid Location, which is generated by a drum clock system at the beginning of each data slot on the drum, will condition a pair of AND circuits 34 and 35. In the meantime, the pulse from the AND circuit 24 is also applied to the Status Bit trigger 12 and complements that trigger to its opposite state.

If the read head, which is connected to a read-write circuit 36, now reads a one from the status band of the drum, the one so read will be passed by the read-write circuits 36 into their output 38 which is an input to the AND circuit 35. The AND circuit 35 is also conditioned at its third input by the high *a* output of the Status Phase trigger 16. Therefore, the AND circuit 35 will pass a pulse to the Write trigger 18. Since the output of the ND circuit 35 along its connector 40 is also a set input the Write trigger 18, the status of this trigger will not be altered since it was originally set by the Go signal at index time by way of the AND circuit 24. As a result, the *a* output of the Write trigger 18 will remain high.

When the Go trigger 14 was turned on, its output on line 28 was impressed as an input to an AND circuit 42 whose other input is the signal Valid Location on connector 44. It is apparent, therefore, that each time a data slot on the drum appears, the signal Valid Location will complement the state of the Status Phase trigger 16. Having first read a one from the status band of the drum, the system operation requires, as above stated, that a one be now written into the next position of the status band. The complementing of the Status Phase trigger, as stated, will, therefore, condition this trigger to produce a potential on its output *b* to produce a writing operation.

The writing of a one into the next position of the status band of the drum will now proceed as follows. Since the Go trigger 14 is still turned on and its output potential is high, it supplies a potential to an AND circuit 46 as one of its four inputs. The second input to the AND circuit 46 is the *a* output of the Write trigger 18 which is high, while the third input to the AND circuit 46 is the *b* output of the Status Phase trigger 16 which is high since the last previous Valid Location signal effectively complemented the Status Phase trigger 16 such that its output was shifted from its *a* side to its *b* side. With three of the four inputs to the AND circuit 36 conditioned, its fourth input, which is the signal Valid Location, will be passed through the AND circuit 46 to produce the signal Write 1. This signal controls the read-write circuits 36 so that the write head will write a one at the location in the status band of the drum introduced by the signal Valid Location. A one may be written over a pre-existing one on the status track without objection. So long as an unbroken series of ones appear in the status band of the drum, the foregoing reading and writing procedure will continue. This reading and writing operation follows from the fact that each succeeding Valid Location signal will operate through the AND circuit 42 to reverse the Status Phase trigger either into its reading or writing state, depending on its last previous state.

When a zero is read from the status band of the drum, it is significant of the fact that the presence of a blank data slot has been detected. It is desired, therefore, upon the reading of a zero, that a data control signal be generated to perform a data operation in the indicated drum slot. These operations take place as follows. The Go trigger 14 has its output connected to a four-way AND circuit 48 and since the Go trigger is in its set state, its input to the AND circuit 48 is high whereby one leg of the circuit is conditioned. The last preceding valid location signal complemented the Status Phase trigger 16 by way of the AND circuit 42 such that the *b* output of the Status Phase trigger will condition a second input of the AND circuit 48. Upon the reading of a zero by the read head, the read-write circuits 36 will operate to transmit a pulse on their output line 50; this line being an input to the AND circuit 34. With the AND circuit conditioned at its second input by the *a* output of the Status Phase trigger 16, the AND circuit will transmit a pulse upon conditioning of its third input by the signal Valid Location. Thus, the Write trigger 18 is reset such that its *b* output is high and conditions the third leg of the AND circuit 48. The AND circuit 48 is now so conditioned that the signal Valid Location is gated therethrough as the signal Data Gate. This signal can, of course, be used to condition the read-write circuits associated with the data band of the drum to control the data read-write action to take place at the approaching data slot.

It is a condition of the system that each time the signal Data Gate is generated upon the reading of a zero in the status band of the drum that the status keeping operation be discontinued pending receipt of a new Go signal. For this purpose, the Data Gate output line has a reset connection with the Go trigger 14 such that this trigger is turned off, thereby effectively deconditioning the system. It will be remembered that the previous Go signal as an input to the Status Bit trigger 12 was used to complement this trigger to its opposite state such that its *b* output is now high so that the system will now be conditioned to first write a one and then alternately read and write ones until the next zero in the status track is encountered, all as illustrated in Fig. 2(*b*). It will also be remembered that when the *a* output of the Status Bit trigger 12 was high, it conditioned the system for first reading a one from the status band of the drum, whereafter it alternately wrote and read ones until a zero was encountered. Thus, since the Status Bit trigger 12 now has a high output on its *b* side, it will impress a potential on the AND circuit 30 which will be gated through by the Go signal at drum index time. The output of the AND circuit 30 is entered into the Status Phase trigger 16 as a reset pulse. This renders the *b* output of the Status Phase trigger high and provides a conditioning potential on one leg of the AND circuit 46. Since the Write trigger has applied thereon a set pulse from the AND circuit 24, its *a* output will be high thereby conditioning the second leg of the AND circuit 46. The Go trigger 14 being turned on, as before, will provide a third conditioning potential for the AND circuit 46. Therefore, when the next Valid Location signal is received at the AND circuit 46, its four inputs will produce the signal Write 1, whereby the read-write circuits 36 will energize the write head such that a one will be written into the first location of the status band. The reading and writing operation will thereafter continue as previously described until another zero is encountered in the status band of the drum, whereupon the circuit will again operate to reverse the state of the Status Bit trigger 12, such that in the next following read-write cycle a one will be read in the first status band position following the drum index.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

We claim:

1. In a data recording system, a magnetic drum having thereon a data band composed of a plurality of angularly spaced data locations and a single associated status band adapted to have recorded a status mark at each data location having a record therein, a single read-write head associated with said status band, read-write circuits connected with said head, an electrical element having a first and second output connected with said circuits for controlling said circuits to read from or write upon said status band, a second electrical element connected to said read-write circuits, said second electrical element having a first and a second output whereby a high output is created on its first output when a status mark is read in said status band and a high output is created on its second output when no mark is read on said status band, a connection between said first output of said second element and said read-write circuits for causing the same to write a mark on said status band after a mark has been sensed thereon by said head, a connection between said second output of said second element and an output signal device for producing a data read-write control signal after no mark is sensed in said status band by said read-write head, means for selectively conditioning said first named element to cause said read-write circuits to read from or write upon said status band at the first location thereof, means for complementing the potential on the outputs of said first named element at each data slot of said drum, and means for reversing the state of the potential on the outputs of said first named element between each data cycle.

2. In a data recording system, a magnetic drum having thereon a data band composed of a plurality of angularly spaced data locations and a single associated status band adapted to have recorded a status mark at each data location having a record therein, a single read-write head associated with said status band, read-write circuits connected with said head, a bistable trigger having a first and second output connected with said circuits for controlling said circuits to read from or write upon said status band, a second bistable trigger connected to said read-write circuits, said second bistable trigger having a first and a second output whereby a high output is created on its first output when a status mark is read in said status band and a high output is created on its second output when no mark is read on said status band, a connection between said first output of said second bistable trigger and said read-write circuits for causing the same to write a mark on said status band after a mark has been sensed thereon by said head, a connection between said second output of said second bistable trigger and an output signal device for producing a data read-write control signal after no mark is sensed in said status band by said read-write head, means for selectively conditioning said first named bistable trigger to cause said read-write circuits to read from or write upon said status band at the first location thereof, means for complementing the state of said first named bistable trigger at each data slot of said drum, and means for reversing the state of said first named bistable trigger between each data cycle.

3. In a data recording system, a magnetic drum having thereon a data band composed of a plurality of angularly spaced data locations and a single associated status band adapted to have recorded a status mark at each data location having a record therein, a single read-write head associated with said status band, read-write circuits connected with said head, a bistable element having a first and second output connected with said circuits for controlling said circuits to read from or write upon said status band, a second bistable element connected to said read-write circuits, said second bistable element having a first and a second output whereby a high output is created on its first output when a status mark is read in said status band and a high output is created on its second output when no mark is read on said status band, a connection between said first output of said second bistable element and said read-write circuits for causing the same to write a mark on said status band after a mark has been sensed thereon by said head, a connection between said second output of said second bistable element and an output signal device for producing a data read-write control signal after no mark is sensed in said status band by said read-write head, a status bit trigger for selectively conditioning said first named bistable element to the state of said status bit trigger to cause said read-write circuits to read from or write upon said status band at the first location thereof, means for complementing the state of said first named bistable element at each data slot of said drum, and means for reversing the state of said status bit trigger between each data cycle.

4. In a data recording system, a magnetic drum having thereon a data band composed of a plurality of angularly spaced data locations and a single associated status band adapted to have recorded a status mark at each data location having a record therein, a single read-write head associated with said status band, read-write circuits connected with said head, an electrical element having a first and second output connected with said circuits for controlling said circuits to read from or write upon said status band, a second electrical element connected to said read-write circuits, said second electrical element having a first and a second output whereby a high output is created on its first output when a status mark is read in said status band and a high output is created on its second output when no mark is read on said status band, a connection between said first output of said second element and said read-write circuits for causing the same to write a mark on said status band after a mark has been sensed thereon by said head, a connection between said second output of said second element and an output signal device for producing a data read-write control signal after no mark is sensed in said status band by said read-write head, means for selectively conditioning said first named element to cause said read-write circuits to read from or write upon said status band at the first location thereof, means for complementing the potential on the outputs of said first named element at each data slot of said drum, means for admitting an initiating signal to said system, and means responsive to an initiating signal for reversing the state of the potential on the outputs of said first named element.

5. In a data recording system, a magnetic drum having thereon a data band composed of a plurality of angularly spaced data locations and a single associated status band adapted to have recorded a status mark at each data location having a record therein, a single read-write head associated with said status band, read-write circuits connected with said head, a bistable trigger having a first and second output connected with said circuits for controlling said circuits to read from or write upon said status band, a second bistable trigger connected to said read-write circuits, said second bistable trigger having a first and a second output whereby a high output is created on its first output when a status mark is read in said status band and a high output is created on its second output when no mark is read on said status band, a connection between said first output of said second bistable trigger and said read-write circuits for causing the same to write a mark on said status band after a mark has been sensed thereon by said head, a connection between said second output of said second bistable trigger and on output signal device for producing a data read-write control signal after no mark is sensed in said status band by said read-write head, a status bit trigger for selectively conditioning said first named bistable trigger to the state of said status bit trigger to cause said read-write circuits to read from or write upon said status band at the first location thereof, means for complementing the state of said first named bistable trigger at each data slot of said drum, and means for admitting an initiating signal to said status bit trigger at the beginning of each data as a complementing input thereto to reverse the state of said status bit trigger between each data cycle.

6. In a data recording system, a magnetic drum having thereon a data band composed of a plurality of angularly spaced data locations and a single associated status band adapted to have recorded a status mark at each data location having a record therein, a single read-write head associated with said status band, read-write circuits connected with said head, a bistable status phase trigger having a first and second output connected with said circuits for controlling said circuits to read from or write upon said status band, a bistable write trigger connected to said read-write circuits, said write trigger having a first and a second output whereby a high output is created on its first output when a status mark is read in said status band and a high output is created on its second output when no mark is read on said status band, a connection between said first output of said bistable write trigger and said read-write circuits for causing the same to write a mark on said status band after a mark has been sensed thereon by said head, a connection between said second output of said bistable write trigger and an output signal device for producing a data read-write control signal after no mark is sensed in said status band by said read-write head, a status bit trigger for selectively conditioning said status phase trigger to the state of said status bit trigger to cause said read-write circuits to read from or write upon said status band at the first location thereof, means for complementing the state of said status phase trigger at each data slot of said drum, means for admitting an initiating signal to said status bit trigger at the beginning of each data cycle as a complementing input thereto to reverse the state of said status bit trigger between each data cycle, and means for selectively setting the state of said status bit trigger.

No references cited.